United States Patent Office 2,981,409
Patented Apr. 25, 1961

2,981,409
SEALING DEVICE FOR LEAD PRESS
Giovanni Colleoni, Milan, Italy, assignor to Pirelli Società per Azioni, Milan, Italy
Filed Jan. 17, 1958, Ser. No. 709,702
Claims priority, application Italy Apr. 13, 1957
1 Claim. (Cl. 207—4)

The present invention relates to a device which may be applied to lead presses and extruders to maintain the electric cables to be lead-sheathed in the conditions existing in the drying and/or impregnating tanks during the passage of the cables from the tanks to said presses or extruders.

The device described in the invention comprises a metallic tube tightly connected at one end with the drying and/or impregnating tank and at its other end with the core die member of a conventional hydraulic press or of a conventional continuous extruder which is used to lead-sheath power cables insulated with paper and with thick or fluid oil, and telephone cables insulated with paper and air.

The object of the present invention is to provide a device of the type disclosed above which is adapted to insure a perfect seal against vacuum or pressure oil losses during passage of the cable to be lead-sheathed from the drying and/or impregnating tank to the press or extruder used to lead-sheath the cable.

Another object of the invention is to provide a device of the type disclosed above which enables an easy exchange of a core die member provided in the lead-sheathing machine against another core die member of different diameter in order to suit the diameter of a cable to be lead sheathed.

A further object of the invention is to enable changes in the length of the tube encircling the cable during its passage from the tank to the die of the lead-sheathing machine caused by the variations of the temperature which may occur during the lead-sheathing operation of the cable.

According to the present invention, these and other objects are accomplished by providing said tube with a main portion connected with the outlet from said tank and with an auxiliary portion which is fixedly secured at one end to the core die member of the lead-sheathing machine and is connected at its other end to said tube by means of a joint that not only seals the connection between said tube and its portion secured to the core die member but also allows variations in the tube length in order to balance the thermal expansions thereof.

This structure affords a set of tube portions, each fixedly secured to a core die member having an inner diameter differing from the diameters of the other core die members, thereby enabling the easy suiting of the lead-sheathing machine to a given diameter of the cable.

Figure 1:
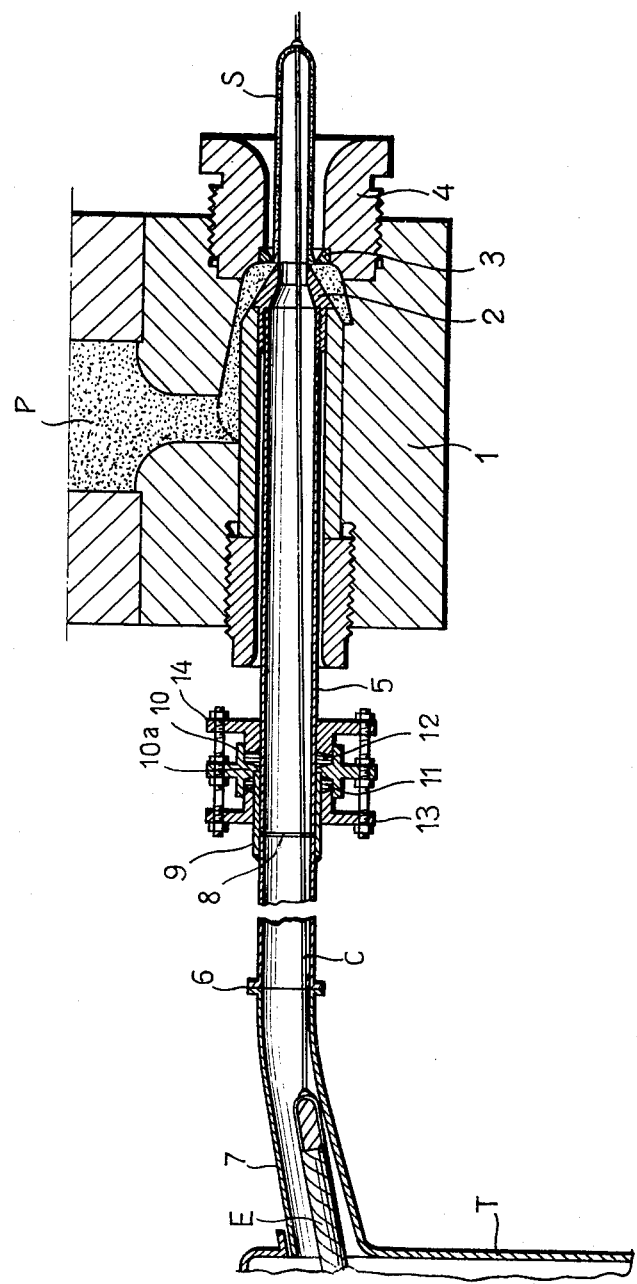
Figure 2:
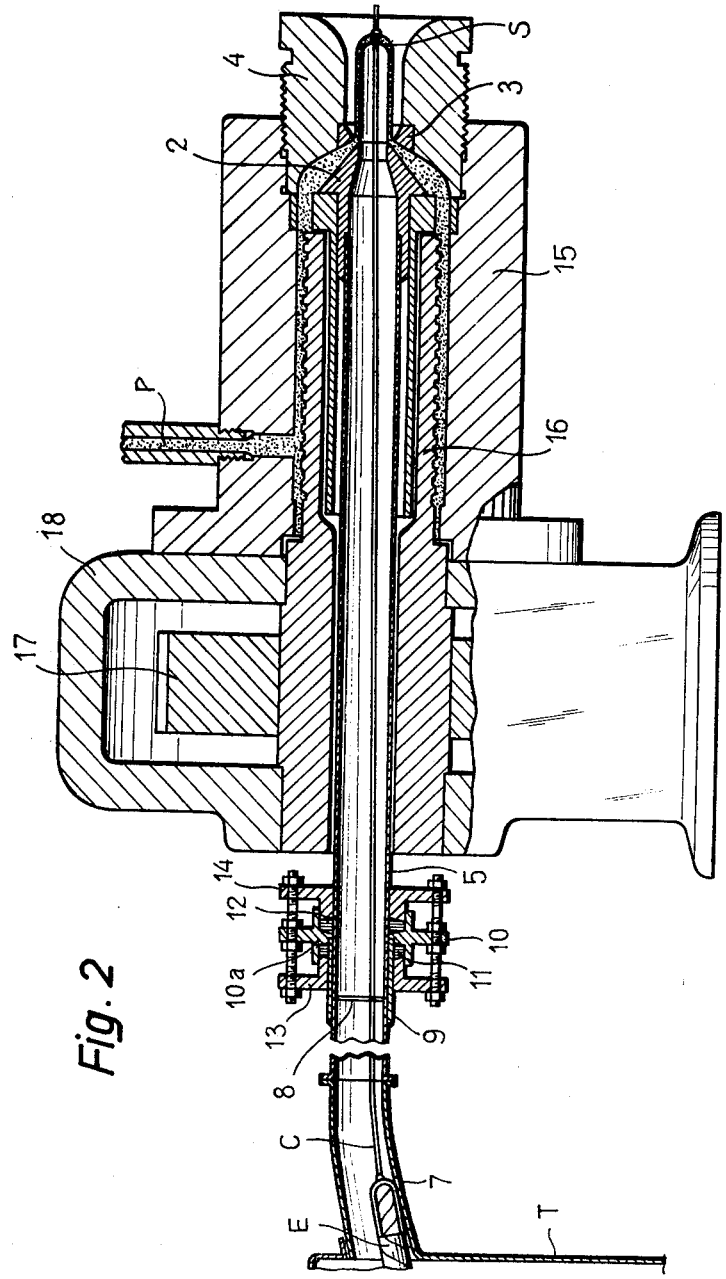

Further characteristics of the invention shall be indicated in the following description, made with reference to the attached drawings, given by way of non-limitative example, in which:

Figure 1 illustrates the application of the invention to a conventional hydraulic press and Figure 2 illustrates the application of the invention to a continuous extruder.

In Figure 1, the reference numeral 1 indicates the press block, 2 is the core die member and 3 the outer die member carried by a die-holder 4.

The lead, indicated with the letter P, is pushed by a hydraulically actuated piston into a chamber in the press block 1 and is extruded between the core die member and the outer die.

According to the present invention the core die member is secured by means of screwing and brazing to the end portion of a tube 5 passing through the block 1; the other end of said tube comprises a tubular conduit member which is fastened by flanges 6 to the tubular extension 7 of the impregnating and drying tank.

The tube 5 is conveniently cut at line 8 separating the main portion of the tube from its end portion inserted into the block 1 to allow its assembly and disassembly and the variations in its length in consequence of the thermal expansion; thus a disassemblable joint for the hermetic seal of the cutting line is provided by the invention.

Said joint comprises a sleeve 9 connected by welding or brazing (according to the drawing) to the left part of the tube, a flanged ring 10 having an inner rib 10a disposed about the terminal part of the sleeve 9 and tight packings 11 and 12 situated between the ring 10 and the sleeve 9 and respectively between said ring and the part of tube 5 to which the sleeve 9 is not secured.

Thrust flanged rings 13 and 14 are axially pushed against the packings 11 and 12 by means of bolts which serve to approach the rings towards each other.

If desired, the tube portion situated between the cut 8 and the flanges 6 may be corrugated in order to allow an easy mechanical adjustment of the connection.

In the drawings the letter T is a vacuum drying and/or impregnating tank, of a type such as for instance disclosed in pending United States patent application Serial No. 668,103 for: "Oil Filled Cables," filed June 26, 1957, and E is the cable to be covered with the lead sheath and S is a short length of lead tube already extruded, the end of which is completely closed and connected with the forward cable end E by means of a metallic wire or rope C. For the sake of simplicity, other details of the unit, which however do not make part of the invention, have been omitted.

Figure 2 illustrates the device forming the object of the invention applied to a continuous lead extruder. In the figure, 15 is the machine block and 16 the feeding worm actuated by the gear 17 rotatable in the frame-bed 18 of the machine.

Like reference numerals indicate like parts of the machine illustrated in Figure 1.

What I claim is:

In an apparatus for lead-sheathing electric cables, a drying and impregnating tank having an outwardly extending metallic tube for conveying an electric cable therefrom, a lead-extruding press having an extrusion chamber and a pair of cooperating annular dies mounted axially in said extrusion chamber, one of said dies being fixedly mounted, means to secure the other die in spaced cooperative relation with said one of said dies, a cable feed tube peripherally secured to said other die and extending outwardly from said press, a tubular conduit member rigidly connected to said metallic tube and extending adjacent the outer end of said cable feed tube in axial alignment therewith, a sleeve fixedly secured on said conduit member and movably receiving the outer end portion of said cable feed tube so that an expansion space is provided between said conduit member and said cable feed tube, a flanged ring surrounding the outer junction of said sleeve and said cable feed tube and having an inwardly projecting rib disposed about and engaging the end of said sleeve, respective packings surrounding the sleeve and the cable feed tube adjacent and on opposite sides of said rib, respective thrust rings surrounding the sleeve and the cable feed tube on opposite sides of said flanged ring and having annular portions engaging the respective packings, and means to urge the thrust rings towards each other and to peripherally push said annular portions against said packings, whereby to define an expansion joint between said conduit member and said cable feed tube.

References Cited in the file of this patent

UNITED STATES PATENTS

| | | |
|---|---|---|
| 212,257 | Norris | Feb. 11, 1879 |
| 288,795 | Hamon | Nov. 20, 1883 |
| 515,951 | Cobb | Mar. 6, 1894 |
| 1,100,002 | Van Ness | June 16, 1914 |
| 1,956,834 | Price | May 1, 1934 |
| 2,074,856 | Piercy et al. | Mar. 23, 1937 |